United States Patent
Eiiliott et al.

(10) Patent No.: US 10,321,012 B2
(45) Date of Patent: Jun. 11, 2019

(54) METHOD FOR IDENTIFYING A MALFUNCTIONING RFID TAG ON A MEDIA SHEET USING AN IMAGING DEVICE

(71) Applicant: LEXMARK INTERNATIONAL, INC., Lexington, KY (US)

(72) Inventors: Delbert Lester Eiiliott, Georgetown, KY (US); Donnie Eugene Proffitt, Richmond, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 15/806,785

(22) Filed: Nov. 8, 2017

(65) Prior Publication Data

US 2019/0141210 A1    May 9, 2019

(51) Int. Cl.
| | |
|---|---|
| H04N 1/00 | (2006.01) |
| H04N 1/32 | (2006.01) |
| G03G 15/00 | (2006.01) |
| G06K 7/10 | (2006.01) |

(52) U.S. Cl.
CPC ....... H04N 1/3263 (2013.01); G03G 15/5087 (2013.01); G06K 7/10366 (2013.01); H04N 1/00342 (2013.01); H04N 1/32138 (2013.01); H04N 1/32657 (2013.01)

(58) Field of Classification Search
CPC ....................... H04N 1/32138; H04N 1/00342
See application file for complete search history.

(56) References Cited

U.S. PATENT DOCUMENTS

| 6,593,853 B1* | 7/2003 | Barrett ................... G06K 1/121 |
| | | 340/4.3 |
| 10,002,636 B1* | 6/2018 | Whitesell ........... G06K 17/0025 |
| 2005/0024393 A1* | 2/2005 | Kondo ................... G03G 15/65 |
| | | 347/2 |
| 2006/0145710 A1* | 7/2006 | Puleston .............. G06K 7/0008 |
| | | 324/754.31 |
| 2006/0226983 A1* | 10/2006 | Forster ................. G01R 31/312 |
| | | 340/572.1 |
| 2007/0252700 A1* | 11/2007 | Ishihara .................. B65C 9/188 |
| | | 340/572.7 |
| 2007/0296554 A1* | 12/2007 | Marcus .................... G06K 7/00 |
| | | 340/10.51 |
| 2008/0074267 A1* | 3/2008 | Sugiyama .............. B41J 3/4075 |
| | | 340/572.1 |

(Continued)

*Primary Examiner* — Benjamin O Dulaney

(57) ABSTRACT

A method for identifying and marking malfunctioning RFID tags on a RFID media sheet using an imaging device having a printer system and a RFID reader programmer. The method detects an unprogrammed RFID tag on the RFID media sheet, performs a write test on the detected RFID tag; determines whether the write test is successful; when the write test is unsuccessful, sends the RFID media sheet to the print engine and prints a bad tag identifier on one of the RFID media sheet and the detected RFID tag; when the write test has been successful, performs a read test on the detected RFID tag and determines whether the read test is successful, when the read test is unsuccessful, sends the RFID media sheet to the print engine and prints the bad tag identifier on one of the RFID media sheet and the detected RFID tag.

9 Claims, 7 Drawing Sheets

(56) References Cited

U.S. PATENT DOCUMENTS

| | | | | |
|---|---|---|---|---|
| 2009/0067910 | A1* | 3/2009 | Sugiyama | B41J 3/4075 400/76 |
| 2010/0214080 | A1* | 8/2010 | Alexis | G06K 7/0095 340/10.51 |
| 2010/0245058 | A1* | 9/2010 | Kojima | B41J 3/4075 340/10.52 |
| 2012/0019399 | A1* | 1/2012 | Vargo | G06K 7/0008 340/870.11 |
| 2014/0062674 | A1* | 3/2014 | Koike | G06K 7/10009 340/10.51 |
| 2016/0189020 | A1* | 6/2016 | Duckett | G06K 1/20 235/462.01 |
| 2017/0011664 | A1* | 1/2017 | Forster | G09F 3/0289 |

* cited by examiner

METHOD FOR IDENTIFYING A MALFUNCTIONING RFID TAG ON A MEDIA SHEET USING AN IMAGING DEVICE

CROSS REFERENCE TO RELATED PATENT APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates to a method of identifying and marking inoperative or malfunctioning RFID tags placed on a media sheet.

2. Description of the Related Art

Radio frequency identification (RFID) systems have been widely employed for tracking items having an attached RFID tag. Media sheets for use in imaging devices may have RFID tags attached as shown in FIG. 5. These media sheets may have one or more RFID tags attached. When multiple RFID tags are present, such RFID tags are usually arranged in rows and columns similar to a sheet of labels. The RFID tags typically have an adhesive layer allowing them to adhere to one surface of the media sheet in various locations as shown in FIG. 5. Typically, the use of a single RFID tag on a media sheet allows for control over the distribution and copying of such media sheet after they are printed. Media sheets with an array of RFID tags have the individual tags programmed and printed with identity information such as a product bar code or model number. The RFID tags are then peeled off, attached to an asset, and used for tracking such asset when in a manufacturing process or when stored in inventory. This may also be done when only a single RFID tag is on the media sheet.

Prior to use, each RFID tag needs to be programmed so that the RFID tag becomes active. However, some RFID tags that pass through the RFID reader programmers may have defects. These include RFID tags that cannot be programmed and RFID tags that can be programmed but cannot be read after programming. Applying a defective RFID tag to an asset does not allow the asset to be monitored in the RFID tag tracking system. The asset is considered "dark" when it cannot be detected by RFID reader/programmers. A "dark" asset can cost the owner a considerable amount of resources in trying to find it.

It would be advantageous to be able to mark malfunctioning RFID tags with a bad tag mark so that such RFID tags can be identified and removed prior to use on an asset. It would be further advantageous to further provide an indication of the problem with a RFID tag that has been identified as "bad".

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein.

DETAILED DESCRIPTION

Figure 1:
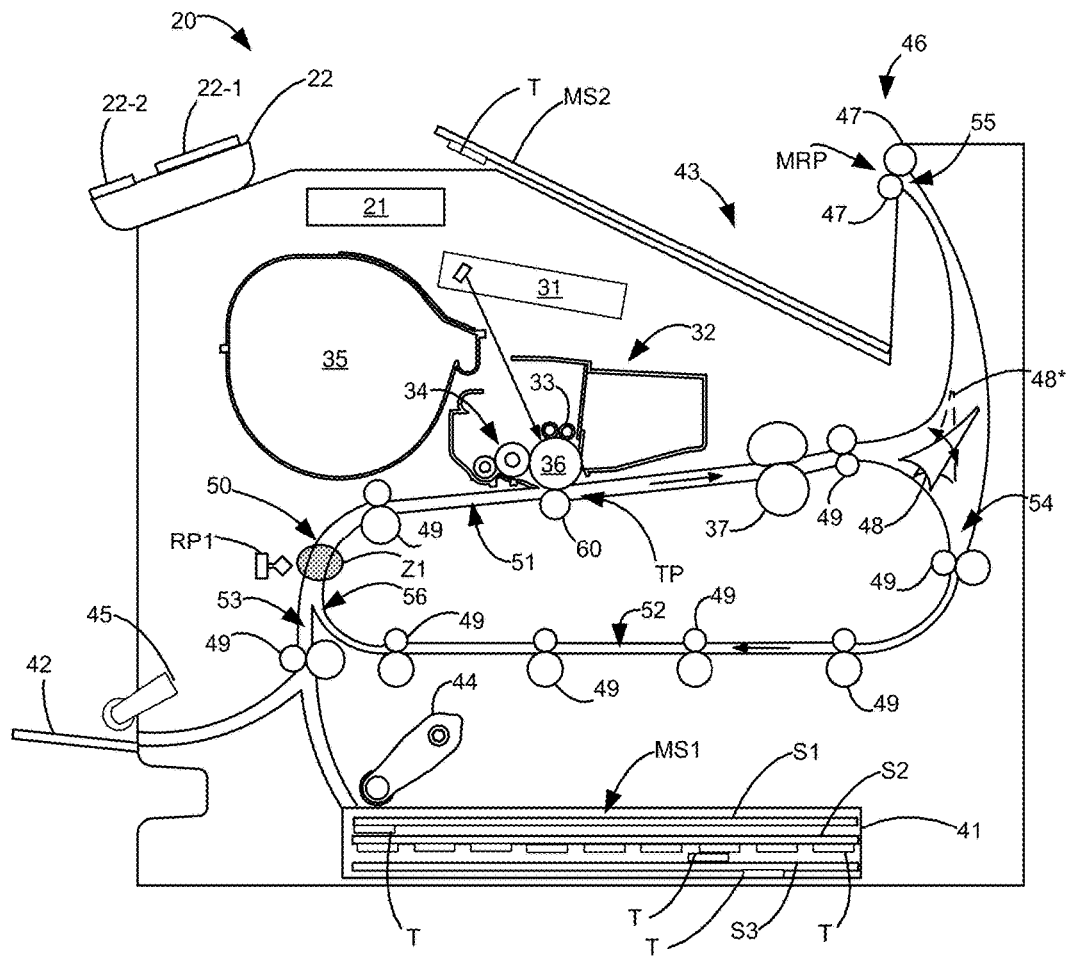
FIG. 1 is a mechanical schematic illustration of a monochromatic imaging system utilizing the presently disclosed method of marking bad RFID tags.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

As used herein, the term "communication link" is used to generally refer to structure that facilitates electronic communication between multiple components, and may operate using wired or wireless technology. Communications among components may be done via a standard communication protocol, such as for example, universal serial bus (USB), Ethernet or IEEE 802.xx.

Figure 2:
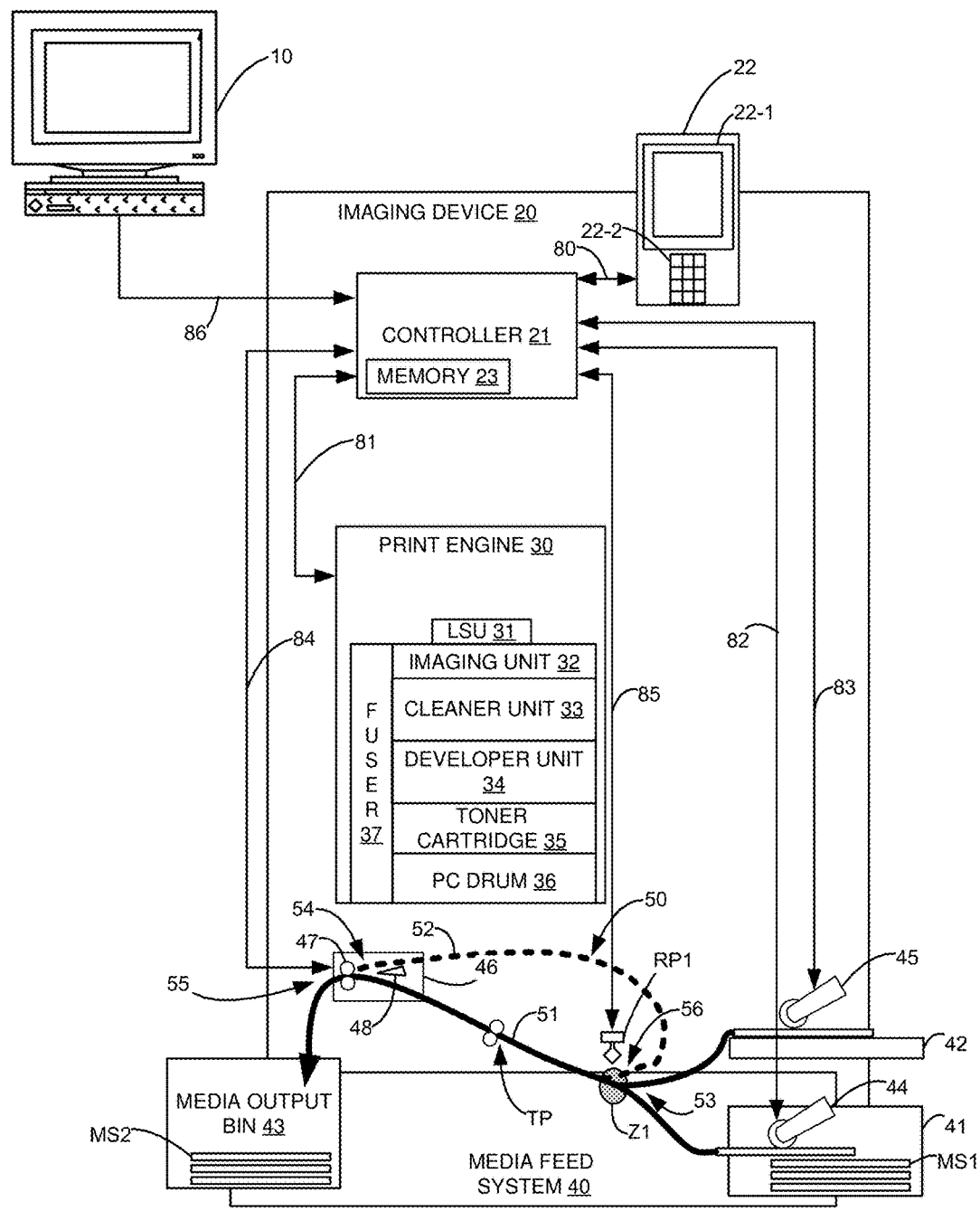
FIG. 2 is a block diagram of the imaging system of FIG. 1.

Referring now to the drawings and particularly to FIGS. 1-2, there is shown a depiction of an imaging device 20 configured in accordance with the present disclosure. Imaging device 20 is shown connected to a computer 10 via a communication link 86 from which it receives an RFID print job as later explained. Imaging device 20 includes a controller 21, a user interface 22, a print engine 30 including a media feed system 40 and a RFID reader programmer RP1. While computer 10 is shown directly connected to imaging device 20, computer 10 may also be remotely connected to imaging device 20 with a computer network or cloud as is well known in the art.

User interface 22 includes a display 22-1 and a keypad 22-2. Print engine 30 may include a laser scan unit (LSU) 31, an imaging unit 32 having a cleaner unit 33, a developer unit 34, a toner cartridge 35, a photoconductive (PC) drum 36, and a fuser 37. Media feed system 40 includes a plurality of media sources—a media input tray 41 and a multipurpose feed tray 42—are shown, a media output bin 43, pick mechanisms 44, 45 mounted in media trays 41, 42, respectively and a duplexer 46 that includes a reversing roll pair 47 adjacent to media output bin 43 and a gate 48 positioned downstream of fuser 37 and upstream of reversing roll pair 47. A plurality of feed roll pairs 49 are provided along a media path 50 to convey media sheets.

Media feed path 50 comprises a simplex path 51 and a duplex path 52. Simplex path 51 has an entrance 53 formed at the confluence of the media paths from each of the media sources such as media trays 41, 42 and an output 55 adjacent media output bin 43. Duplex path 52 has an input 54 adjacent to gate 48 and an exit 56 adjacent to the entrance 53 of simplex path 51. As shown in FIG. 1, exit 56 is downstream of entrance 53. Also positioned adjacent to entrance 53 of simplex path 51 is first RFID reader/programmer RP1 having a first interrogation zone Z1.

Using media feed system 40, controller 21 controls the feeding of media sheets from either of trays 41, 42 along simplex path 51 to the output media bin 43 or using duplexer 47 along duplex path 52. Pick mechanisms 44, 45 are used to pick a media sheet from media trays 41, 42, respectively, and send them into simplex path 51.

Controller 21 includes a processor unit and associated memory 23 and may be formed as one or more Application Specific Integrated Circuits (ASICs). Memory 23 may be any volatile or non-volatile memory or combination thereof such as, for example, random access memory (RAM), read only memory (ROM), flash memory and/or non-volatile RAM (NVRAM). Alternatively, memory 23 may be in the form of a separate electronic memory (e.g., RAM, ROM, and/or NVRAM), a hard drive, a CD or DVD drive, or any processing device convenient for use with controller 21.

In the example embodiment illustrated, controller 21 communicates with user interface 22 via a communication link 80. Controller 21 communicates with print engine 30 via a communication link 81. Controller 21 communicates with pick mechanisms 44, 45 via communication links 82, 83, respectively. Controller 21 communicates with duplexer 46 via a communication link 84. Controller 21 communicates with first RFID reader programmer RP1 via a communication link 85. Controller 21 processes RFID print job commands and operates a user interface 22, print system 30, media feed system 40, and first RFID reader programmer RP1. While multiple communication links are shown within imaging device 20, a single communication link between controller 21 and each of the other components that it controls or communicates with may be used as is known in the art.

A first media stack MS1 containing RFID media sheets is shown in media input tray 41. A RFID media sheet may have one or more RFID tags T, also simply referred to as a tag T, adhering to one or both surfaces of the RFID media sheet. RFID media sheet 51 illustrates a single tag T on one surface. RFID media sheet S2 shows a plurality of tags T in an array on one surface thereof while RFID media sheet S3 shows tags T on both surfaces. When the tags T are in an array, they are normally arranged in a row and column manner as shown in Figure C and after programming and printing are peeling off the RFID media sheet and affixed to an asset to be tracked. Multipurpose media feed tray 42 may also be used to feed either a single media sheet or a small number of media sheets having unprogrammed tags T.

A second media stack MS2 is shown in the media output bin 43 containing one or more RFID media sheets that have been printed and their tags T programmed and/or marked in accordance with the presently disclosed bad tag marking method.

In general, a RFID print job is received from computer 10 by controller 21 in imaging device 20. As is known in the art, the RFID print job contains information that will be printed on one or both surfaces of the media sheet along with RFID tag information. RFID tag information includes data that is to be programmed into the tag T and may also include XY coordinates for locating each tag T on the media sheet, particularly when the media sheet contains an array of tags. Alternatively, first RFID reader programmer RP1 may be used to locate the one or more tags T when the RFID media sheet is fed into media path 50 from one of the media input sources. Regardless of whether the tag location information is found in the print job or is determined using first RFID reader programmer RP1, such tag location information is used for the programming of the tags T and/or the printing of images or text on the tag itself. Where the tag locating information is found in the print job, either the print job or a user selects a media tray having the appropriate type of blank RFID media sheet loaded prior to performing the programming and printing of the RFID media sheets.

Figure 1A:
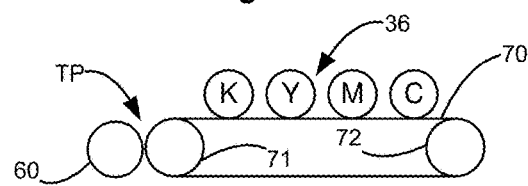
FIG. 1A is a mechanical schematic illustration of an intermediate transfer member unit that may be used in lieu of the direct image transfer shown in FIG. 1 and is typically used in color imaging systems.

A RFID media sheet is fed from one of the media input sources 41, 42 into simplex path 51 passing through interrogation zone Z1 of first RFID reader programmer RP1 where the one or more tags T on the RFID media sheet are programmed. The RFID media sheet is then moved to an image transfer point TP formed between PC drum 36 and a transfer roll 60 where a toned image on the PC drum 36 is transferred to one side of a media sheet passing therebetween. Where imaging device 20 is a color device, an intermediate transfer belt 70 as shown in FIG. 1A may be used to transfer toned images from a series of four PC drums 36, designated C, M, Y and K for the colors cyan, magenta, yellow and black. Intermediate transfer belt 70 is wrapped around two rolls 71, 72, one of which is driven, and receives the toned images from each of the four color PC drums as it passes beneath them. Transfer roll 60 forms image transfer point TP with intermediate transfer belt 70 at one of the two rolls 71, 72, roll 71 as shown, at which the toned color image is transferred from the intermediate transfer belt 70 onto a first surface of the media sheet passing through image transfer point TP.

After passing through the image transfer point TP, the media sheet is then passed through fuser 37 where the toned image is fixed to the media sheet. The media sheet then passes into duplexer 46 where gate 48, in a first position, directs the media sheet to reversing roll pair 47 that provides a media reversal point MRP. For a simplex operation, at the MRP, reversing roll pair 47 feeds the single-sided printed media sheet into the media output bin 43. For a duplex operation, with the media sheet at the MRP, gate 48 is moved to a second position, as indicated by the dashed line image 48* in FIG. 1. The rotation of reversing roll pair 47 is then reversed, sending the media sheet past gate 48 into the entrance 54 of duplex path 52, where it is redirected back into simplex media path 51 for printing on the second side of the media sheet at the image transfer point TP. After fusing the image on the second side of the media sheet, the double-sided media sheet is fed by reversing roll pair 47 into the media output bin 43.

The electrophotographic imaging process used in print system 30 is well known in the art and, therefore, will only be briefly described. During a printing operation, laser scan unit 31 creates a latent image on a photoconductive drum 36.

Toner is then transferred from the developer unit 34 to the latent image on the photoconductive drum 36 to create a toned image. The toned image is then transferred, either directly or through an intermediate transfer belt, to a media sheet received from media input tray 41. Next, the toned image is fused to the media sheet in fuser 36 using heat and/or pressure and sent to an output bin 43 or to one or more finishing options such as a duplexer or finisher (not shown). Toner remnants are removed from the photoconductive drum using cleaner unit 33. As toner is depleted from developer unit 34, toner is transferred from toner cartridge 35 into developer unit 34. Controller 21 provides for the coordination of these activities occurring during the printing process.

Figure 3:
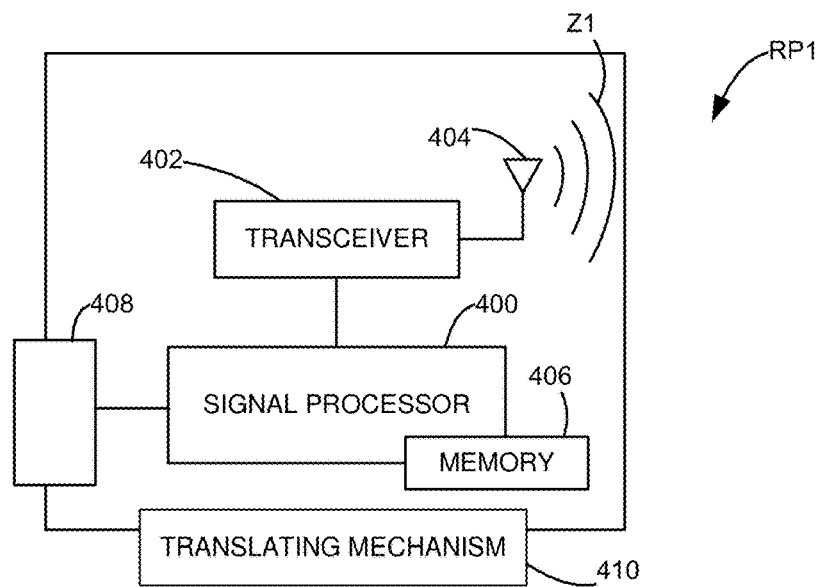
FIG. 3 is a schematic diagram of a RFID reader programmer used in the imaging system of FIG. 1.

FIG. 3 shows a schematic illustration of RFID reader programmer RP1 used to locate, read and program radio frequency identification (RFID) tags on the RFID media sheets. RFID reader programmer RP1 includes a signal processor 400 and a transceiver 402, such as a radio transceiver or transponder, communicatively coupled to signal processor 400. Transceiver 402 is also communicatively coupled to an antenna 404, such as a loop antenna 404, which is used to create the interrogation zone Z1. Signal processor 400 may include an associated memory 406 and may be a processor, microprocessor, controller and/or microcontroller formed as one or more Application Specific Integrated Circuits (ASICs). Memory 406 may be any memory device convenient for use with or capable of communicating with signal processor 400. Signal processor 400 may communicate with transceiver 402 and may serve to provide data for programming a RFID tag to transceiver 402 for transmission by antenna 404, or to receive data received from a RFID tag for processing. Signal processor 400 is also communicatively coupled to a communication chip 408 that is communicatively connected to controller 21 via communication link 85. Communication chip 408 transmits RFID tag data and RFID user data to be programmed in the detected tag or tags T. Reader programmer RP1 may be mounted on an optional translating mechanism 410 allowing reader programmer RP1 to move transversely to the media path 50.

Reader programmer configurations useable with the present disclosed method for testing media sheet having multiple RFID tags may be found in U.S. Pat. No. 7,223,030 B2, issued May 29, 2007 and entitled "System And Methods For Determining Physical Location Of RFID Tags On Embedded Print Media," U.S. Pat. No. 7,249,819 B2, issued Jul. 31, 2007, and entitled "Apparatus And Methods Of Detecting Relative Position Of RF Signature on Print Media," and U.S. Pat. No. 7,646,284, issued Jan. 12, 2010, entitled "Systems And Apparatus For Writing Data To Multiple RF Tags Contained On Print Media", all assigned to the assignee of the present disclosure and incorporated by reference herein.

RFID reader programmer RP1 may be derived from a wide variety of RFID readers capable of reading a number of passive, active, and/or semi-passive RFID tags simultaneously within the interrogation zone such as interrogation zone Z1.

Transceiver 402 generally uses antenna 404 to transmit radio frequency signals to the RFID tags and receive response signals therefrom. Antenna 404 may be tuned to one or more frequencies at which transceiver 402 interrogates and communicates with a particular RFID tag within the interrogation zone Z1. Antenna 404 may be implemented with one or more antennae. In one example, transceiver 402 may have two or more antennae for localization. The design of RFID reader programmer RP1 is a matter of design choice and not of limitation.

Figure 4:
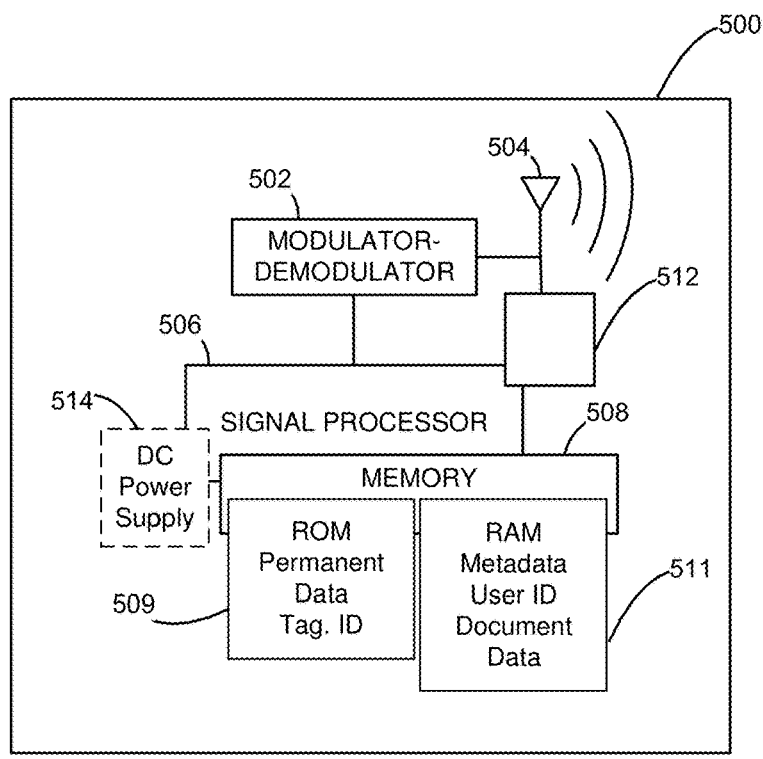
FIG. 4 is a schematic diagram of a RFID tag that may be used on media used with the imaging system of FIG. 1.

FIG. 4 illustrates a schematic example of RFID tag 500 that may be found either on the RFID media sheet. Each RFID tag 500 can be passive, active or battery-assisted passive. An active RFID tag has an on-board battery and periodically transmits its RFID tag ID signal. A battery-assisted passive RFID tag has a small battery on board and is activated when in the presence of a RFID reader programmer A passive tag is cheaper and smaller because it has no battery; instead, the tag uses the radio energy transmitted by the RFID reader programmer. However, to operate a passive tag, it must be illuminated with a power level roughly a thousand times stronger than for signal transmission. RFID tags may either be read-only, having a factory-assigned serial number that is used as a key into a database, or may be read/write, where object-specific data can be written into the tag by the system user. Programmable tags may be write-once, read-multiple and blank tags may be written with an electronic product code by the user.

In general, a RFID tag contains an integrated circuit for storing and processing information that modulates and demodulates a radio-frequency (RF) signal, a means of collecting DC power from the incident reader signal, and an antenna for receiving and transmitting the signal. The RFID tag information is stored in a non-volatile memory. The RFID tag includes either fixed or programmable logic for processing the transmission and sensor data, respectively.

RFID tag 500 may include a communications control unit 502, shown as modulator/demodulator 502, an antenna 504, a signal processor 506, and an associated memory 508. A passive tag would include a power scavenging circuit 512 to scavenge a portion of the energy received by antenna 504 and use it to power the RFID tag 500. An active RFID tag would include a DC power supply 514, such as a battery. When the RFID tag 500 is within interrogation zone Z1, the communications control unit 502 of each RFID tag 500 may decode and/or demodulate received information/interrogation signals from reader programmer RP1 and encode, modulate, and transmit information/response signals to RFID reader programmer RP1 using antenna 504. Antenna 504 may be tuned to a frequency or frequencies at which transceiver 402 communicates with RFID tag 500. Memory 508 includes read only memory (ROM) 509 and random access memory (RAM) 511. ROM 509 is used to contain RFID tag data that is meant to be permanent data and includes a unique RFID tag identifier or ID. This RFID tag ID may be preprogrammed by the manufacturer, or, in an alternate form, may be programmed when first used. RAM 511 contains what is termed RFID user data that can be written and/or altered. RFID user data can include model number, serial number of an asset to be tracked, location data, and time and date data. The data list is for purposes of example and not of limitation.

In operation, RFID reader programmer RP1 may broadcast a plurality of interrogation signals in the form of electromagnetic waves to RFID tags within its interrogation zone Z1. In response, the RFID tag or tags on the media sheet or the original document sheet that is within the interrogation zone may return a response signal in the form of electromagnetic waves to the interrogating RFID reader programmer RP1. The RFID reader programmer RP1 uses characteristics of received response signals to determine information associated with the responding RFID tag on the media sheet. For example, RFID reader programmer RP1 may collect the RFID tag data on the RFID tag on the media sheet.

Figure 5:
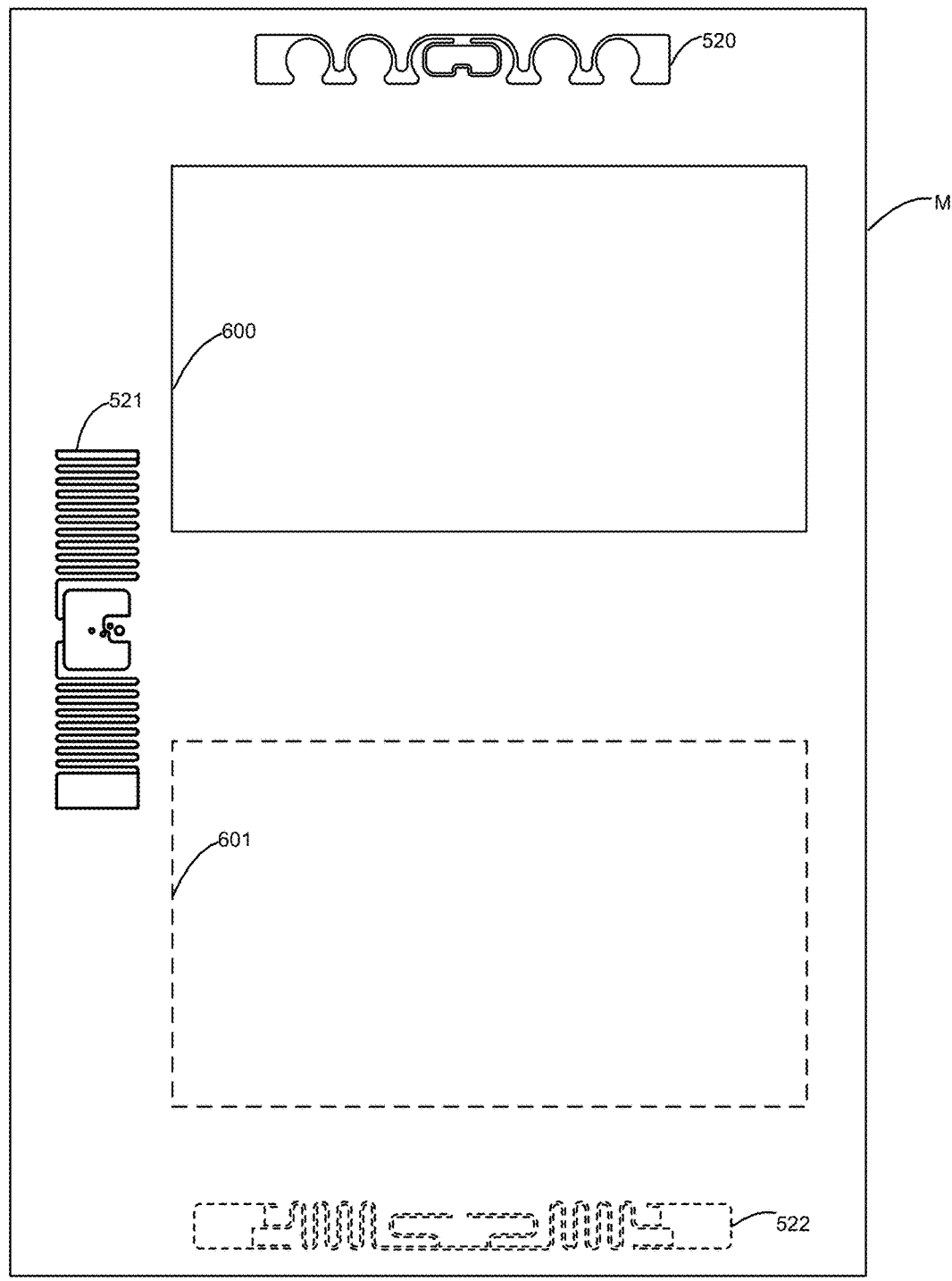
FIG. 5 is an example of a media sheet illustrating locations of RFID tags thereon.

FIG. 5 illustrates an example media sheet M having several examples of and locations for RFID tags. Print engine 30 is used to apply images on one or both surfaces of media sheet M as indicated by a box 600 provided on a first surface thereof and a dashed box 601 provided on the second or opposite surface thereof. Three example RFID tags 520, 521, 522 are shown positioned within the top, left and bottom margins of media sheet M. Tag 522 in dashed line is shown positioned on the opposite surface. RFID tags 520-522 typically have an adhesive layer for attaching them to the media sheet. For a thicker media sheet, the RFID tag may be embedded between the two surfaces of the media sheet. RFID tags 520, 521 are examples of a short dipole ultrahigh frequency (UHF) RFID tag. RFID tags 520, 521 operate at 860-960 MHz, each having a preprogrammed RFID tag ID and 128 bits of EPC memory for storing user data. RFID tag 522 operates at 840-960 MHz and has a 32-bit tag ID, an unalterable 64-bit unique tag ID for authentication, an extensible EPC memory bank, and 512 bits of user memory with password-protected read and write support capabilities to prevent unauthorized viewing and modification of the data on the RFID tag. The type and location of the RFID tag is one of design choice and not of limitation.

Figure 6:
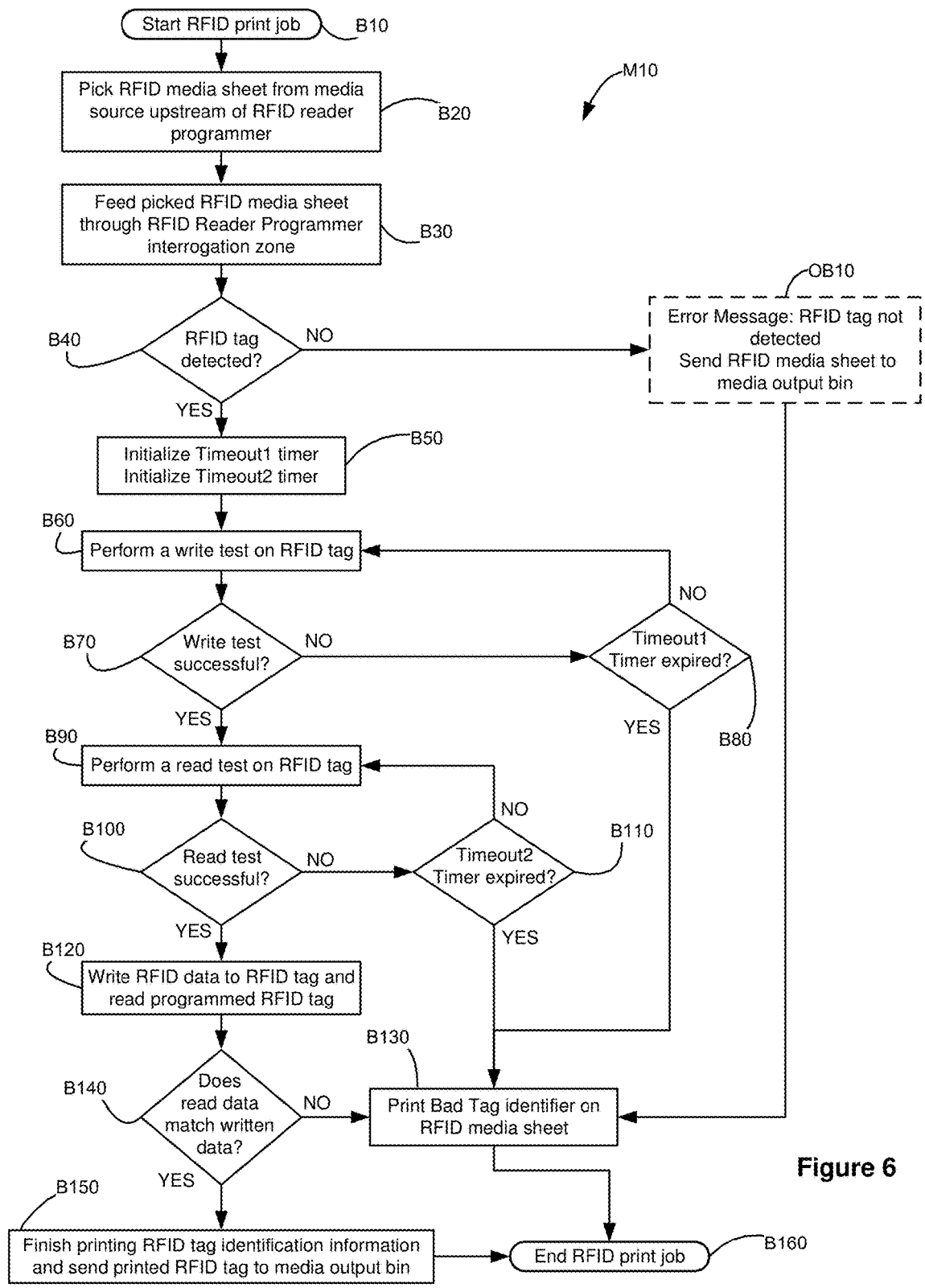
FIG. 6 is a flowchart illustrating an example method of marking a bad RFID tag according to an example embodiment of the present disclosure.

Referring to FIG. 6, a method for identifying and marking malfunctioning RFID tags on the media sheet using an imaging device will be described. A malfunctioning RFID tag includes a RFID tag that cannot be detected by the reader programmer RP1, a RFID tag that cannot successfully pass the write test, a RFID tag that cannot successfully pass the read test, and a RFID tag that cannot be successfully programmed with the RFID tag data. Imaging device 20 having an RFID reader programmer RP1 positioned along the media path downstream of the media sources performs the presently disclosed method.

Generally, the method comprises a RFID media sheet having a RFID tag or tags being picked from a media source such as media trays 41, 42 and sent along the media path 51 into interrogation zone Z1 of RFID reader programmer RP1. For each RFID tag on the media sheet that is detected, it is tested using a write then read test. Should the detected RFID tag fail the test, it will be identified as a "bad tag". The write test comprises RFID reader programmer RP1 writing a known data set to the RFID tag memory. Should the write test not successfully occur within a first predetermined time period, the RFID tag will be identified as a bad tag. The read test comprises the RFID reader programmer RP1 receiving from the written to RFID tag the data set just written to the RFID tag. The data set received from the RFID tag is compared to the data set written to the RFID tag and should the two data sets not match, the RFID tag being test will be identified as a "bad tag" and then will be marked with a "bad tag" identifier at print engine 30.

As shown in FIG. 6, method M10 starts at block B10 where a RFID print job is sent to imaging device 20. A RFID print job is one where one or more RFID tags on a media sheet are to be programmed and printed. Depending on the type of media sheet used, the RFID tag may be peeled from the media sheet and applied to another item or it may remain attached to the media sheet. Images may be placed either on the RFID tag itself, the media sheet on which it resides, or on both using the print engine 30 (see FIGS. 7-9). The RFID print job may include the RFID data to be programmed into each RFID tag on the media sheet along with the number and may also include XY coordinates of the location of each RFID tag on the media sheet.

At block B20, controller 21 uses one of pick mechanisms 44, 45 to pick an RFID media sheet from one of the media sources, such as media trays 41, 42 and send it along media path 51 to interrogation zone Z1 of reader programmer RP1 at block B30. At block B40, a determination is made whether or not at least one RFID tag is detected on the picked media sheet. When it is determined that no RFID tag has been detected, method M10 may proceed to block B130 where the media sheet is sent to print engine 30 to be marked with a Bad Tag identifier. Optionally, rather than proceeding to block B130, method M10 may, at optional block OB10, display on user interface 22 an error message that no RFID tag has been detected and the picked media sheet may then be sent to the media output bin 43.

When it is determined that a RFID tag has been detected at block B40, method M10 at block B50 initializes two timers designated Timeout1 timer and Timeout2 timer to predetermined time periods. Next at block B60, a write test is performed on each RFID tag detected. At block B70, a determination is made whether or not the write test was successful. When it is determined that the write test was unsuccessful, at block B80, a determination is made whether or not Timeout1 timer has expired. When it is determined that Timeout1 timer has not expired, method M10 loops back to block B60 to re-perform the write test. When it is determined at block B80 that Timeout1 timer has expired, method M10 proceeds to block B130, previously described.

When it is determined at block B70 that the write test was successful, method M10 proceeds to block B90 to perform a read test on the detected RFID tag. At block B100, a determination is made whether or not the read test was successful. When it is determined that the read test was unsuccessful, at block B110 a determination is made whether or not Timeout2 timer has expired. When it is determined that Timeout2 timer has not expired, method M10 loops back to block B90 to re-perform the read test. When it is determined at block B110 that Timeout2 timer has expired, method M10 proceeds to block B130, previously described.

When it is determined at block B100 that the read test was successful, method M10 proceeds to block B120 to program the detected RFID tag with the desired RFID data and then the RFID data is read back from the RFID tag. Next at block B140, a test is performed to determine whether or not the read RFID data matches the RFID data written to the RFID tag. When it is determined that the RFID data read from the RFID tag does not match the RFID data written to the RFID tag, method M10 proceeds to block B130. When it is determined that the RFID data read from the RFID tag does match the RFID data written to the RFID tag, method M10 proceeds to block B150 where the media sheet is sent to print engine 30 for receiving identification information or other images and then sent to the media output bin 43.

Method M10 ends at block B160. Blocks B50-B150 are repeated for each RFID tag detected on the picked RFID media sheet.

Figure 7:
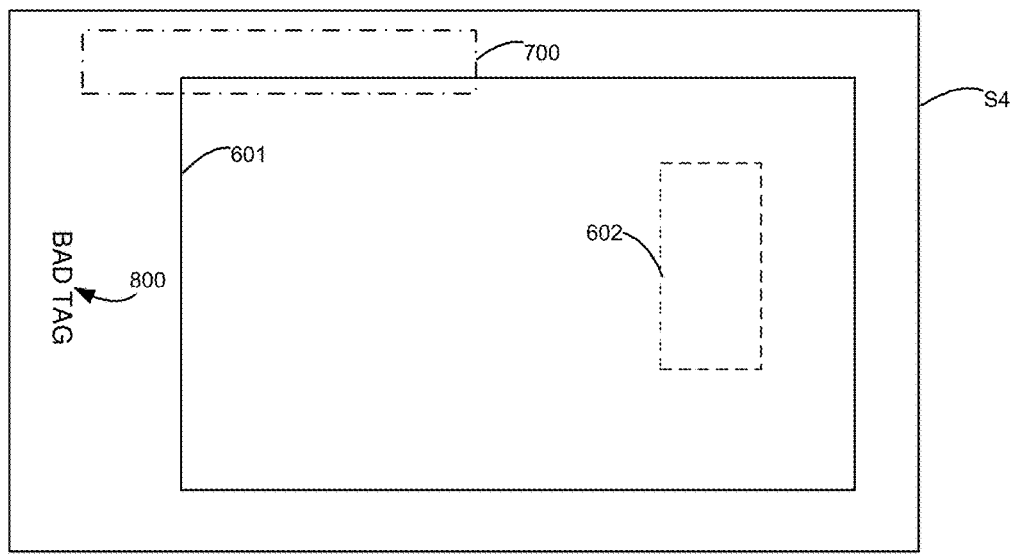
FIG. 7 is an example of a media sheet having a bad RFID tag where the bad RFID tag mark is provided on the opposite surface of the sheet to the surface on which the RFID tag is applied.
Figure 8:
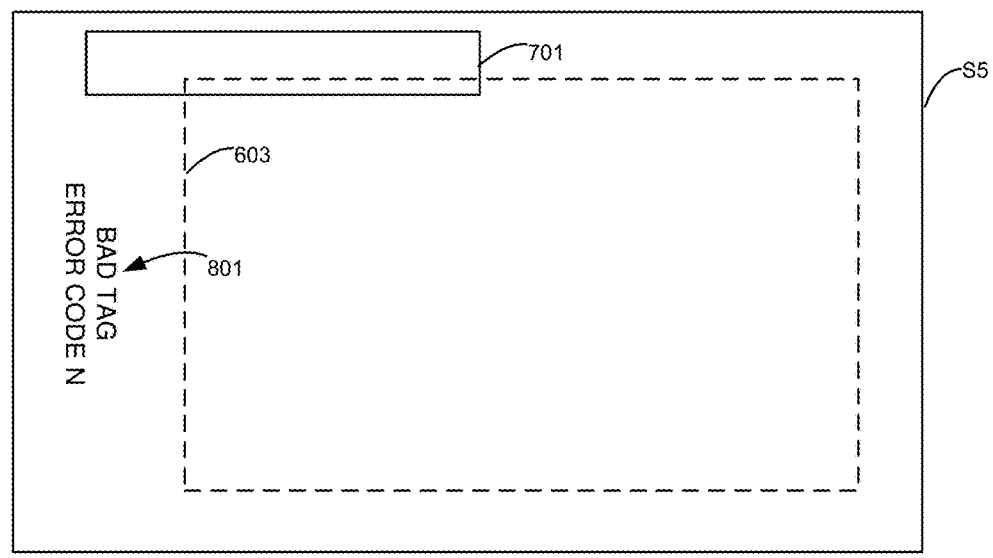
FIG. 8 is an example of a media sheet having a bad RFID tag where the bad RFID tag mark is provided on the same surface of the sheet on which the RFID tag is applied.
Figure 9:
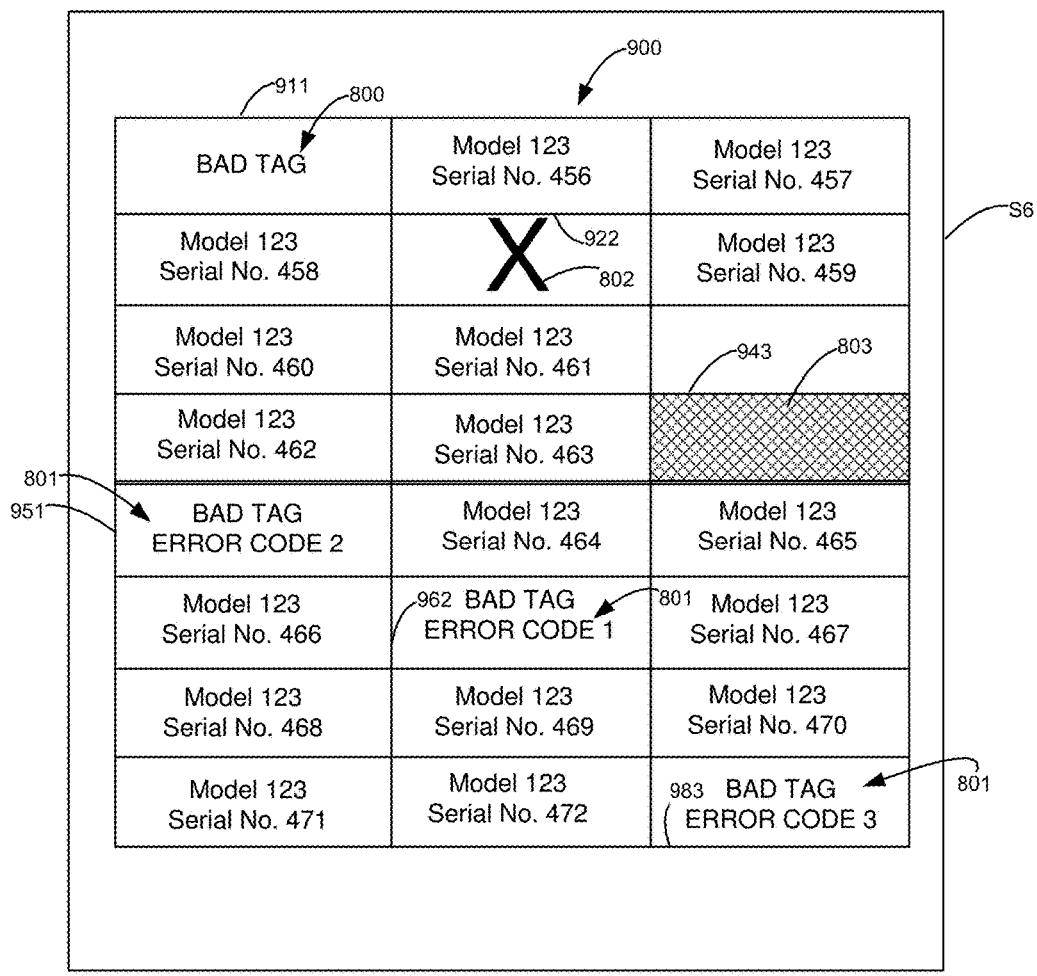
FIG. 9 is an example of a media sheet having multiple RFID tags with several marked bad RFID tags illustrating a variety of example bad RFID marks printed thereon.

FIGS. 7-9 illustrate example bad tag identifiers applied to the RFID media sheet and/or to the RFID tag on such media sheet. FIGS. 7 and 8 illustrate a single RFID tag mounted on the RFID media sheet while FIG. 9 illustrates multiple RFID tags mounted on the RFID media sheet.

As shown in FIG. 7, an RFID tag 700 is mounted on a second surface of RFID media sheet S4. An image 601, indicated by block 601, has been printed on a first side of RFID media sheet S4 and a second image 602, indicated by dashed block 602, has been printed on a second side of RFID media sheet S4. RFID tag 700 has been found to be a bad tag using method M10. A bad tag identifier 800, consisting of the phrase "BAD TAG", has also been printed on the first side of RFID media sheet S4.

As shown in FIG. 8, the RFID tag 701 is mounted on a second surface of RFID media sheet S5. Image 603, indicated by the dashed block 603, has been printed on a first side of RFID media sheet S5. Again RFID tag 701 has been found to be a bad tag using method M10. A bad tag identifier 801 has been printed on the second side of RFID media sheet S5 consisting of the phrase "BAD TAG ERROR CODE N", where N represents a number associated with a particular error found. Table 1 below illustrates example error codes.

TABLE 1

| Error Code | Error Type |
| --- | --- |
| 1 | Write Test Failed |
| 2 | Read Test Failed |
| 3 | Programming Failed |

The above list of error codes and error types are for purposes of illustration and not limitation.

Media sheet S6 shown in FIG. 9 has a plurality of RFID tags, generally indicated at 900, in a table arranged in a row and column or X-Y. A variety of bad tag identifiers that are shown printed directly on each bad RFID tag are illustrated. RFID tag 911 (row 1, column 1) has the bad tag identifier 800 while RFID tags 951 (row 5, column 1), 962 (row 6, column 2), and 983 (row 8, column 3), use the bad tag identifier 801 with error codes 2, 1, and 3 respectively. RFID tag 922 (row 2, column 2) has the bad tag identifier 802 shown as an "X". RFID tag 943 (row 4, column 3 has the bad tag identifier 803 shown as a cross-hatch pattern 803. Any combination of letters, words, symbols and patterns may be used as a bad tag identifier.

The foregoing description of several example embodiments of the disclosed method have been presented for purposes of illustration. It is not intended to be exhaustive or to limit the disclosed method to the precise steps disclosed, and obviously many modifications and variations are possible in light of the above teaching. It is intended that the scope of the invention be defined by the claims appended hereto.

What is claimed is:

1. In an imaging device having a media input area having one or more RFID media sheets having an unprogrammed RFID tag mounted thereon and a media output area having a media path therebetween, the imaging device including a print engine and a radio frequency identification (RFID) reader programmer positioned along the media path, the first RFID reader programmer for reading and programming the RFID tag, a method for identifying a malfunctioning RFID tag, comprising:

receiving at the imaging device a RFID print job having RFID tag data to be programmed into the unprogrammed RFID tag on the RFID media sheet;

picking the RFID media sheet having the unprogrammed RFID tag thereon from the media input area and sending the picked RFID media sheet into an interrogation zone of the RFID reader programmer;

performing a write test on the RFID tag detected by the RFID reader programmer;

determining whether or not that the write test was successful;

upon determining that the write test was unsuccessful, sending the RFID media sheet to the print engine and printing a bad tag identifier on one of the RFID media sheet and the detected RFID tag;

upon determining that the write test was successful, performing a read test on the on the detected RFID tag;

determining whether or not that the read test was successful; and upon determining that the read test was unsuccessful, sending the RFID media sheet to the print engine and printing the bad tag identifier on one of the RFID media sheet and the detected RFID tag, further wherein, upon determining that the read test has been successful, writing the RFID tag data to the detected RFID tag, reading from the detected RFID tag the RFID tag data written thereto and comparing the RFID tag data read from the detected RFID tag with the RFID tag data written to the detected RFID tag; and upon determining that the RFID tag data read from the detected RFID tag does not match the RFID tag data written to the detected RFID tag, sending the RFID media sheet to the print engine and printing the bad tag identifier on one of the RFID media sheet and the detected RFID tag.

2. The method of claim 1 further comprising:

upon determining that the RFID tag data read from the detected RFID tag does match the RFID tag data written to the detected RFID tag, sending the RFID media sheet to the print engine for printing information on one of the detected RFID tag and the media sheet.

3. In an imaging device having a media input area having one or more RFID media sheets having an unprogrammed RFID tag mounted thereon and a media output area having a media path therebetween, the imaging device including a print engine and a radio frequency identification (RFID) reader programmer positioned along the media path, the RFID reader programmer for reading and programming the RFID tag, a method for identifying a malfunctioning RFID tag, comprising:

receiving at the imaging device a RFID print job having a RFID tag data to be programmed into the unprogrammed RFID tag on the RFID media sheet;

picking the RFID media sheet having the unprogrammed RFID tag thereon from the media input area and sending the picked RFID media sheet into an interrogation zone of the RFID reader programmer;

detecting the unprogrammed RFID tag on the picked RFID media sheet; and upon detecting the unprogrammed RFID tag on the picked RFID media sheet, performing the following actions:
  initializing a Timeout1 timer and a Timeout2 timer to respective predetermined time values;
  performing a write test on the detected RFID tag and determining whether or not that the write test was successful;
  upon determining that the write test has unsuccessful, determining whether or not the Timeout1 timer has expired;
  upon determining that the Timeout1 timer has not expired, repeating the write test;
  upon determining that the Timeout1 timer has expired, sending the RFID media sheet to the print engine and printing a bad tag identifier on one of the RFID media sheet and the detected RFID tag;
  upon determining that the write test was successful, performing a read test on the detected RFID tag;
  determining whether or not that the read test was successful;
  upon determining that the read test was unsuccessful, determining whether or not the Timeout2 timer has expired;
  upon determining that the Timeout2 timer has not expired, repeating the read test; and
  upon determining that the Timeout2 timer has expired, sending the RFID media sheet to the print engine and printing the bad tag identifier on one of the RFID media sheet and the detected RFID tag.

4. The method of claim 3 wherein the bad tag identifier is selected from the group comprised of an "X" symbol, a pattern, a phrase "Bad Tag", a phrase "Bad Tag Error Code N" where N represents a number for an error code, and a combination of two or more of the foregoing.

5. The method of claim 3 further comprising:
upon not detecting the unprogrammed RFID tag on the RFID media sheet, sending the RFID media sheet to the media output area and displaying an error message on a user interface of the imaging device.

6. The method of claim 3 further comprising:
upon determining that the read test has been successful, writing the RFID data to the detected RFID tag, reading from the detected RFID tag the RFID data written thereto and comparing the RFID data read from the detected RFID tag with the RFID data written to the detected RFID tag; and
upon determining that the RFID data read from the detected RFID tag does not match the RFID data written to the detected RFID tag, sending the RFID media sheet to the print engine and printing the bad tag identifier on one of the RFID media sheet and the detected RFID tag.

7. The method of claim 6 further comprising:
upon determining that the RFID data read from the detected RFID tag does match the RFID data written to the detected RFID tag, sending the RFID media sheet to the print engine for printing identifying information on one of the detected RFID tag and the media sheet.

8. In an imaging device having a media input area having one or more RFID media sheets having a plurality of unprogrammed RFID tags mounted thereon and a media output area having a media path therebetween, the imaging device including a print engine and a radio frequency identification (RFID) reader programmer positioned along the media path, the first RFID reader programmer for reading and programming the plurality of unprogrammed RFID tags on the RFID media sheet, a method for identifying and marking a malfunctioning RFID tag on the RFID media sheet, comprising:
  receiving at the imaging device a RFID print job having a RFID tag location coordinates for each unprogrammed RFID tags in the plurality of unprogrammed RFID tags and RFID tag data to be programmed into each of the unprogrammed RFID tags in the plurality of unprogrammed RFID tags on the RFID media sheet;
  picking the RFID media sheet having the plurality of unprogrammed RFID tags from the media input area and sending the picked RFID media sheet into an interrogation zone of the RFID reader programmer;
  detecting one or more RFID tags on the picked RFID media sheet;
  upon detecting one or more RFID tags on the picked RFID media sheet, performing the following actions for each detected RFID tag:
    initializing a Timeout1 timer and a Timeout2 timer to respective predetermined time values;
    performing a write test and determining whether or not that the write test is successful;
    upon determining that the write test has not been successful, determining whether or not the Timeout1 timer has expired;
    upon determining that the Timeout1 timer has not expired, repeating the write test;
    upon determining that the write test has been successful, performing a read test and determining whether or not that the read test is successful;
    upon determining that the read test has not been successful, determining whether or not the Timeout2 timer has expired;
    upon determining that the Timeout2 timer has not expired, repeating the read test;
    upon determining that one of the Timeout1 timer and the Timeout2 timer has expired when testing each detected RFID tag, sending the RFID media sheet to the print engine and printing a bad tag identifier on each of the detected RFID tags that did not pass one of the write test and the read test.

9. The method of claim 8 wherein the bad tag identifier is selected from the group comprised of an "X" symbol, a cross-hatch pattern, a phrase "Bad Tag", a phrase "Bad Tag Error Code N" where N represents a number for an error code, and a combination of two or more of the foregoing.

* * * * *